Patented June 6, 1939

2,161,663

UNITED STATES PATENT OFFICE 2,161,663

REMOVAL OF HYDROGEN SULPHIDE AND HYDROCYANIC ACID AND OF READILY VOLATILE LIQUIDS FROM GASES

Hans Baehr and Wilhelm Wenzel, Leuna, and Helmut Mengdehl, Huels, Westphalia, Germany, assignors to I. G. Farbenindustrie Aktiengesellschaft, Frankfort-on-the-Main, Germany No Drawing. Application October 28, 1936, Serial No. 108,010. In Germany December 20, 1933

8 Claims. (Cl. 23—3)

The present invention relates to the removal of hydrogen sulphide or hydrocyanic acid or both and of the vapors of readily volatile organic liquids from gases containing these substances.

Many gases occur in industry which are contaminated by hydrogen sulphide or hydrocyanic acid or both and which must be purified from these constituents before use. As examples of such gases may be mentioned for instance coke oven gas, or waste gases from the destructive hydrogenation of carbonaceous materials, or cracking gases, or gases obtained by the low-temperature carbonization of coals or peat. Gases of this kind often also contain the vapors of readily volatile organic liquids, as for example benzene, benzine, carbon disulphide, alcohol, ether or acetone. It is often desirable or necessary to remove also these substances from the gases.

For the removal of weak gaseous acids, as for example hydrogen sulphide, carbon dioxide and hydrocyanic acid, from gases containing the same, in particular industrial gases, it has already been proposed to wash the gases with solutions of organic bases in water, the substances absorbed by the solutions being then recovered by heating. Recently it has also been proposed to use basic-reacting salts of alkali metals or alkaline earth metals in combination with weak organic acids, as for example alkali metal salts of aliphatic aminocarboxylic acids or their derivatives, such as glycocoll or iminodipropionic acid, instead of organic bases.

On the other hand, vapors of readily volatile liquids are often removed from gases by passing the gases through so-called washing oils, in which the readily volatile liquids are retained and from which they may be recovered by heating, for example by introducing steam. The washing oils usually consist of tar oils of high boiling point, but other oils having similar properties may also be used.

The removal of hydrogen sulphide or hydrocyanic acid or both and of the vapors of readily volatile organic liquids from gases according to the practice hitherto usual thus involves two entirely separate operations, each of which requires large apparatus and a high expenditure of energy for the regeneration of the washing media.

We have now found that hydrogen sulphide or hydrocyanic acid or both and the vapors of readily volatile organic liquids can be removed from gases containing the same in a much more advantageous manner, namely in a single stage operation, by scrubbing the gases with dispersions, i. e., true solutions or colloidal solutions or emulsions or suspensions, in organic solvents, of basic compounds capable of absorbing hydrogen sulphide and hydrocyanic acid and giving them off again when heated.

The organic solvents used should have a high boiling point, usually above 160° or 200° C., so that the readily volatile organic liquids may be recovered therefrom in a simple manner by distillation. Suitable solvents are, for example, mineral oils, tar oils, ordinary or low-temperature tars, cracking tars, high boiling oils obtained by the destructive hydrogenation of carbonaceous materials, as for example of coals, and alcohols of high boiling point, preferably not below 160° C. Mixtures of several solvents may also be used, whereby the solubility of the basic compounds may be increased or the absorption of the hydrogen sulphide and/or hydrocyanic acid improved.

The basic compounds used should have a basicity sufficiently high to render them capable of forming salts with the hydrogen sulphide or hydrocyanic acid to be removed from the gas; for that reason, aniline, for example, is not suitable for the purposes of the present invention.

The basic compounds may belong, for example, to the classes of alkylamines, as for instance dibutylamine or dodecylamine or the amine mixture obtainable by the catalytic reduction of the amides of high molecular fatty acids, as for example of coconut fatty acids; ethylene diamine or its polymers and derivatives thereof, as for example diethyldihydroxyethyl ethylenediamine or methylated triethylenetetramine; amino-alcohols, as for example alkylolamines, such as diethanolamine or triethanolamine or butanolamine, or alkylalkylolamines, such as methylethanolamine, ethyldiethanolamine or butyldiethanolamine, or alcohols containing several nitrogen atoms, such as tetramethyl-diaminopropanol; polymerization products of ethylene imine or its homologues or derivatives; arylamines, such as phenylenediamine or tetraaminonaphthalene or diaminotetrahydronaphthalene; arylalkylamines, such as phenyl-ethylenediamine or methyl-m-phenylenediamine; quinolines, such as quinoline and its homologues or crude quinoline bases; pyridines, such as pyridine or crude pyridine bases or piperidine or its homologues; quaternary ammonium bases of the said compounds, as for example tetrabutylammoniumhydroxide; basic salts of strong inorganic or organic bases with weak acids, as for example piperidine borate, tetramethylammonium borate, sodium phosphate, the sodium salt of alanine, the triethanolamine salt of diethylglycocoll, the tetramethylethylenediamine salt of dimethylalanine, the sodium salt of tetraethyl-diethylenetriamino-mono-acetic acid, trihydroxyethyl-ethylenediamino-mono-acetic acid or its potassium salt, the tetrahydroxyethyl-ethylenediamine salt of pentahydroxyethyl-triethylenetetramino-propionic acid, the sodium salt of diethylhydroxyethyl-ethylenediamino-mono-acetic acid, sodium stearate, or alkali metal salts of amino or nitro phenols or of amino or nitro naphthols or of boric acid may be employed. It is not so advantageous to employ phenols themselves as weak acids, since they are easily evaporated when heating the spent washing liquid for regeneration. The basic compounds are preferably employed in the form of true solutions, and accordingly amines which are soluble in the organic solvents are preferably employed.

It is often preferable to employ such amines as are tertiary, i. e., as do not contain hydrogen atoms connected directly to the nitrogen atom or atoms, or quaternary ammonium bases derived from such tertiary amines. Similarly, when using salts of strong inorganic or organic bases with weak acids, such compounds are preferably used as are free from hydrogen atoms directly connected to nitrogen atoms. In this way an interaction between the basic substances and organic sulphur compounds, especially carbon disulphide, is avoided. Such interaction would result in the basic substances being rendered inactive for the removal of hydrogen sulphide and hydrocyanic acid. This is important because many industrial gases of the kind coming into consideration for the process according to the present invention, contain organic sulphur compounds, especially carbon disulphide.

The amounts of basic compound and solvent may be adapted to the requirements of each particular case, but generally speaking an amount of the basic compound corresponding to about 10 per cent by volume of the solvent is very suitable. The basic compounds should as a rule be so selected that at the temperatures employed in the regeneration step they are not volatilized to any substantial extent, if at all.

The gases to be purified are washed with one of the said washing agents containing a basic substance at about room temperature, the absorbed gaseous and vaporous constituents being expelled by heating when saturation of the washing medium is complete. The washing out of the gases may be carried out at atmospheric, increased or reduced pressure.

As has already been mentioned, the regeneration of the washing media is effected by heating. Thereby the hydrogen sulphide and/or hydrocyanic acid and the readily volatile organic liquids which have been absorbed, are driven out and are separated in the vapor state from the washing media. The readily volatile organic liquids are separated from the hydrogen sulphide and/or hydrocyanic acid by condensation, the acid gases being recovered in the gaseous state. The said condensation of the readily volatile organic liquids is preferably effected by means of dephlegmators, column apparatus or towers filled with Raschig rings, in order to obtain them as free from the gaseous acids as possible. The gaseous acids may contain small amounts of the readily volatile organic liquids which may be recovered therefrom by washing the gaseous acids with oil.

The gaseous weak acids obtained may be worked up in any desired manner. For example, the hydrogen sulphide may be oxidized to sulphur in a Claus furnace; it may also be burnt to form sulphur dioxide, the latter being converted into sulphuric acid or reacted with ammonia with the formation of ammonium sulphite, ammonium thionate or ammonium sulphate. Hydrocyanic acid may be disposed of by introducing it into alkaline solutions, as for example caustic alkali or alkali metal carbonate solutions, whereby alkali metal cyanides are obtained. When mixtures of hydrogen sulphide and hydrocyanic acid are recovered, they are usually comparatively rich in hydrogen sulphide and may be worked by passing them into a Claus furnace, in which not only the hydrogen sulphide is oxidized to sulphur, but the bulk of the hydrocyanic acid is destroyed.

Any slight amount of hydrogen sulphide which may still remain in the gas to be purified, may be removed in the usual manner if necessary.

The process according to this invention has the great advantage that it requires much less equipment and expenditure of energy than the processes hitherto in use. For example, in coke oven plants the usual benzol washers serving for the recovery of benzene may be used directly; it is only necessary to provide for a small dephlegmator, or the like, by which the gaseous acids are separated from the benzene in the regeneration step. On the other hand, the usual plants for the desulphurization may be much smaller or entirely dispensed with.

The process has the further distinctive advantage that it effects no substantial removal of carbon dioxide along with hydrogen sulphide and/or hydrocyanic acid and the readily volatile liquids. When industrial gases containing carbon dioxide are treated in the manner hitherto usual by means of aqueous solutions of the aforesaid basic substances, not only the hydrogen sulphide and/or hydrocyanic acid are absorbed by the basic substances, but also the carbon dioxide. However, in such cases there is often no objection to the carbon dioxide remaining in the gas. Its absorption, therefore, places an unnecessary burden upon the plant for the removal of hydrogen sulphide and/or hydrocyanic acid, since a large proportion of the basic substances is used up for the absorption of the carbon dioxide, and therefore a correspondingly larger amount of the basic substance must be used to ensure a sufficient absorption of hydrogen sulphide and hydrocyanic acid. Of course, this gives rise to heavy costs in expelling the said gaseous acids from the solution saturated with these acids.

In the process according to the present invention, however, carbon dioxide contained in the gases is not extensively absorbed by the said washing solutions, probably because the hydration of the carbon dioxide which is usually the preliminary stage to its combination with the basic substances, can only take place in a small degree and proceeds too slowly. According to this invention, therefore, a selective absorption of hydrogen sulphide and hydrocyanic acid takes place, so that no basic substance or only a small amount thereof is spent for the absorption of carbon dioxide. This involves a corresponding reduction of the costs for the regeneration of the washing media. For that reason the process according to this invention is of importance for the preferential removal of hydrogen sulphide and hydrocyanic acid from gases containing the same in addition to carbon dioxide, even when the gases do not contain the vapors of readily volatile organic liquids; it should be noted, however, that the process comes mainly into consideration for the treatment of gases containing such vapors.

The following examples will further illustrate the nature of this invention but the invention is not restricted to these examples. The percentages are by volume.

Example 1

Coal distillation gas containing about 3 per cent of carbon dioxide, 0.8 per cent of hydrogen sulphide and 0.8 per cent of benzene hydrocarbons is trickled in a washing tower with a washing medium consisting of 90 per cent of washing oil (a fraction boiling between 200° and 300° C. of mineral coal tar) and 10 per cent of an amine mixture obtained by reducing the amides of coconut fatty acids. About 1 liter of washing medium is circulated per cubic meter of the gas. The washing medium absorbs per liter 22 grams of benzene, 10.5 grams of hydrogen sulphide, 0.6 gram of hydrocyanic acid and 5 grams of carbon dioxide. The saturated washing medium is then heated to about 100° C. in a preheater and passes at this temperature into an expelling column in which it is treated with direct steam. The expelled gases and vapors are withdrawn and cooled, the benzene and steam being liquefied while the weak acids pass on in the gaseous phase. The benzene and water are passed through a degasifying column in which the dissolved gases are expelled. The latter are trickled with oil in a small washer to remove small amounts of benzene; this part of the oil is preferably incorporated with the washing medium circulating in the main apparatus and regenerated therewith. The gas, purified from benzene vapor, which consists mainly of hydrogen sulphide, is burnt to form sulphur and sulphur dioxide; the latter may be worked up into sulphuric acid, ammonium sulphite, ammonium thionate or ammonium sulphate.

Example 2

A coke oven gas containing per cubic meter 8 grams of ammonia, 10 grams of hydrogen sulphide, 3 per cent of carbon dioxide and 22 grams of benzene hydrocarbons is washed with a washing medium composed of 10 per cent butylmonoethanolamine and 90 per cent of a washing oil as defined in Example 1. From 800 to 1000 cubic meters of gas are treated with 1 cubic meter of the medium, which latter takes up all of the ammonia, hydrogen sulphide and hydrocyanic acid, about 1 per cent of the carbon dioxide, about 70 per cent of the organic sulphur compounds and about from 90 to 95 per cent of the benzene hydrocarbons present in the gas. The spent liquid, after preheating in a heat exchanger, is then heated to about 140° C., whereby all volatile constituents are driven off. The latter are separated by cooling into the gaseous and the normally liquid constituents. The benzene hydrocarbons are purified in any known or suitable manner, whereas the gaseous constituents which contain ammonia and hydrogen sulphide are passed through a mixture of sulphuric acid and phosphoric acid, whereby the ammonia is combined and the hydrogen sulphide escapes. The latter is burnt in a Claus furnace to form sulphur.

Example 3

A waste gas resulting from the destructive hydrogenation of brown coal which in addition to about 30% of butane and about 20 per cent of propane contains about 6 per cent of hydrogen sulphide and about 5 per cent of carbon dioxide, is scrubbed with a solution of about 10 per cent strength of pentamethyl diethylene triamine in an oil resulting from the destructive hydrogenation of brown coal and boiling between about 200° and 300° C. For each 50 cubic meters of gas 1 cubic meter of the solution is employed. The liquid takes up the whole of the hydrogen sulphide and a large proportion of the butane and propane. The spent washing liquid is regenerated by heating in the manner described in the foregoing examples and after cooling may be employed again for scrubbing the gas.

Example 4

A gas resulting from the low temperature carbonization of brown coal and containing an addition to about 3 per cent of hydrogen sulphide and about 25 per cent of carbon dioxide between about 10 and about 15 per cent of benzine hydrocarbons is freed from tar and cooled whereby a part of the benzine is separated. The resulting gas is scrubbed with a fraction of the low temperature tar boiling between about 200° and about 300° C. in which have been dissolved about 12 per cent of N.N'.N''-trimethyl-N.N''-dihydroxyethyl-diethylene triamine. When employing 1 cubic meter of solution for each 100 cubic meters of gas, the hydrogen sulphide as well as the benzine hydrocarbons are completely removed from the gas. When regenerating the spent solution by heating in the manner described in the foregoing examples, the hydrogen sulphide is obtained in the gaseous state and the benzine in the liquid state.

This application is a continuation in part of our copending application Ser. No. 702,542, filed December 15, 1933.

What we claim is:

1. The process of removing a weak gaseous acid, selected from the group consisting of hydrogen sulphide and hydrocyanic acid and mixtures thereof, and the vapors of a readily volatile organic liquid from a gas containing the same without removing any substantial amount of carbon dioxide contained in said gas mixture, which process comprises washing said gas with a dispersion, in a high-boiling organic solvent for said readily volatile liquid, of a difficultly volatile organic basic compound capable of combining with said weak gaseous acid at the operating temperature and giving it off on heating, heating the dispersion when charged with substances absorbed from said gas, thereby expelling hydrogen sulphide and said readily volatile liquids in the gaseous state, withdrawing the expelled substances in the gaseous state from said dispersion, and condensing said readily volatile liquids from said expelled substances.

2. The process of removing hydrogen sulphide and the vapors of a readily volatile organic liquid from a gas containing the same without removing any substantial amount of carbon dioxide contained in said gas mixture, which process comprises washing said gas with a dispersion, in a high-boiling organic solvent for said readily volatile liquid, of a difficultly volatile organic basic compound capable of combining with hydrogen sulphide at the operating temperature and giving it off on heating, heating the dispersion when charged with substances absorbed from said gas, thereby expelling hydrogen sulphide and said readily volatile liquid in the gaseous state, withdrawing the expelled substances in the gaseous state from said dispersion, and condensing said readily volatile liquid from said expelled substances.

3. The process of removing hydrogen sulphide and the vapors of a readily volatile organic liquid from a gas containing the same without removing any substantial amount of carbon dioxide contained in said gas mixture, which process comprises washing said gas with a dispersion, in a high-boiling organic solvent for said readily volatile liquid, of a difficulty volatile organic basic compound capable of combining with hydrogen sulphide at the operating temperature and giving it off on heating, said basic compound being free from hydrogen atoms directly connected to a nitrogen atom, heating the dispersion when charged with substances absorbed from said gas, thereby expelling hydrogen sulphide and said readily volatile liquid in the gaseous state, withdrawing the expelled substances in the gaseous state from said dispersion, and condensing said readily volatile liquid from said expelled substances.

4. The process of removing hydrogen sulphide and the vapors of a readily volatile organic liquid from a gas containing the same without removing any substantial amount of carbon dioxide contained in said gas mixture, which process comprises washing said gas with a solution, in a high-boiling organic solvent for said readily volatile liquid, of a difficultly volatile organic basic compound capable of combining with hydrogen sulphide at the operating temperature and giving it off on heating, said basic compound being free from hydrogen atoms directly connected to a nitrogen atom, heating the dispersion when charged with substances absorbed from said gas, thereby expelling hydrogen sulphide and said readily volatile liquids in the gaseous state, withdrawing the expelled substances in the gaseous state from said dispersion, and condensing said readily volatile liquids from said expelled substances.

5. The process of removing hydrogen sulphide and the vapors of a readily volatile organic liquid from a gas containing the same without removing any substantial amount of carbon dioxide contained in said gas mixture, which process comprises washing said gas with a solution, in a high-boiling organic solvent for said readily volatile liquid, of butyl-diethanol amine, heating the dispersion when charged with substances absorbed from said gas, thereby expelling hydrogen sulphide and said readily volatile liquids in the gaseous state, withdrawing the expelled substances in the gaseous state from said dispersion, and condensing said readily volatile liquids from said expelled substances.

6. The process of removing hydrogen sulphide and the vapors of a readily volatile organic liquid from a gas containing the same without removing any substantial amount of carbon dioxide contained in said gas mixture, which process comprises washing said gas with a solution, in a high-boiling organic solvent for said readily volatile liquid, of a compound corresponding to the general formula

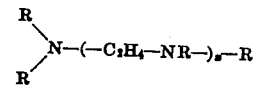

in which $x$ is a whole number ranging from 1 to 3 and R is a group selected from the class consisting of the alkyl and hydroxyalkyl groups, heating the dispersion when charged with substances absorbed from said gas, thereby expelling hydrogen sulphide and said readily volatile liquids in the gaseous state, withdrawing the expelled substances in the gaseous state from said dispersion, and condensing said readily volatile liquids from said expelled substances.

7. The process of removing hydrogen sulphide and the vapors of a readily volatile organic liquid from a gas containing the same without removing any substantial amount of carbon dioxide contained in said gas mixture, which process comprises washing said gas with a solution, in a high-boiling organic solvent for said readily volatile liquid, of pentamethyl-diethylene triamine, heating the dispersion when charged with substances absorbed from said gas, thereby expelling hydrogen sulphide and said readily volatile liquids in the gaseous state, withdrawing the expelled substances in the gaseous state from said dispersion, and condensing said readily volatile liquids from said expelled substances.

8. The process of removing hydrogen sulphide and the vapors of a readily volatile organic liquid from a gas containing the same without removing any substantial amount of carbon dioxide contained in said gas mixture, which process comprises washing said gas with a solution, in a high-boiling organic solvent for said readily volatile liquid, of N.N'.N''-trimethyl-N.N''-dihydroxy-ethyl-diethylene-triamine, heating the dispersion when charged with substances absorbed from said gas, thereby expelling hydrogen sulphide and said readily volatile liquids in the gaseous state, withdrawing the expelled substances in the gaseous state from said dipersion, and condensing said readily volatile liquids from said expelled substances.

HANS BAEHR.
WILHELM WENZEL.
HELMUT MENGDEHL.